(12) United States Patent
Kim

(10) Patent No.: US 10,850,737 B2
(45) Date of Patent: Dec. 1, 2020

(54) DRIVING LANE CHANGING APPARATUS AND DRIVING LANE CHANGING METHOD

(71) Applicant: MANDO CORPORATION, Pyeongtaek-si (KR)

(72) Inventor: Byung Joo Kim, Yongin-si (KR)

(73) Assignee: MANDO CORPORATION, Pyeongtaek-si (KR)

( * ) Notice: Subject to any disclaimer, the term of this patent is extended or adjusted under 35 U.S.C. 154(b) by 422 days.

(21) Appl. No.: 15/800,467

(22) Filed: Nov. 1, 2017

(65) Prior Publication Data

US 2018/0118215 A1    May 3, 2018

(30) Foreign Application Priority Data

Nov. 1, 2016  (KR) .......................... 10-2016-0144371

(51) Int. Cl.
| | | |
|---|---|---|
| *G08G 1/16* | (2006.01) | |
| *B60W 30/095* | (2012.01) | |
| *G05D 1/02* | (2020.01) | |
| *B60W 30/18* | (2012.01) | |
| *B60W 40/04* | (2006.01) | |

(52) U.S. Cl.
CPC .. *B60W 30/18163* (2013.01); *B60W 30/0956* (2013.01); *B60W 40/04* (2013.01); *G05D 1/0276* (2013.01); *G08G 1/166* (2013.01); *G08G 1/167* (2013.01); *B60W 2554/80* (2020.02); *B60W 2720/12* (2013.01); *G05D 2201/0213* (2013.01)

(58) Field of Classification Search
CPC ......... B60W 2520/00; B60W 2520/10; B60W 2550/00; B60W 2550/20; B60W 2550/30; B60W 2550/302; B60W 2550/308; B60W 2720/00; B60W 2720/12; B60W 30/00; B60W 30/08; B60W 30/095; B60W 30/0956; B60W 30/18; B60W 30/18009; B60W 30/18163; B60W 40/00; B60W 40/02; B60W 40/04; G05D 1/00; G05D 1/02; G05D 1/021; G05D 1/0276; G05D 2201/00; G05D 2201/02; G05D 2201/0213; G08G 1/00; G08G 1/16; G08G 1/166; G08G 1/167
See application file for complete search history.

(56) References Cited

U.S. PATENT DOCUMENTS

2005/0256630 A1* 11/2005 Nishira .............. B60K 31/0008
                                                        701/96

* cited by examiner

*Primary Examiner* — Charles J Han
(74) *Attorney, Agent, or Firm* — Hauptman Ham, LLP

(57) ABSTRACT

A driving lane changing apparatus of a host vehicle comprises a microcontroller. The microcontroller detects information about one or more vehicles traveling in a neighboring lane from a current lane of the host vehicle based on sensing information generated by a sensor of the host vehicle, determines whether the host vehicle is allowed to move to the neighboring lane based on the sensing information, controls the host vehicle to move adjacently to a line distinguishing between the current lane of the host vehicle and the neighboring lane, calculates longitudinal relative distance information between the host vehicle and the one or more vehicles at a preset time point in which the host vehicle moves to the line, and re-determines whether the host vehicle is allowed to move to the neighboring lane based on the calculated longitudinal relative distance information at the preset time point.

9 Claims, 10 Drawing Sheets

DRIVING LANE CHANGING APPARATUS AND DRIVING LANE CHANGING METHOD

CROSS REFERENCE TO RELATED APPLICATION

This application claims priority from Korean Patent Application No. 10-2016-0144371, filed on Nov. 1, 2016, which is hereby incorporated by reference for all purposes as if fully set forth herein.

BACKGROUND OF THE INVENTION

1. Field of the Invention

The present disclosure relates to driving lane changing technologies.

2. Description of the Prior Art

Generally, as to automobiles, mechanical and electronic technologies that have been developed in accordance with the development of civilization are being collectively integrated. In recent years, along with the exuberance of daily life, the spread of the automobiles has been greatly expanded for smooth work, convenience of everyday life, and leisure use in keeping with the ever-changing environment.

When driving such an automobile, it is essential for a driver to maintain a safe distance from other automobiles in order to prevent safety accidents.

However, since the driver only visually judges a relationship with the other automobiles, particularly, with automobiles traveling in side lanes when performing lane change during driving, there is a possibility that a problem caused by driver's misperception may occur depending on the situation.

Accordingly, in order to provide convenience to the driver, a vehicle control system has been recently developed, which is provided with a sensor installed on the side of a subject vehicle to automatically calculate a distance from other vehicles traveling in the side lane, and then generates an alarm sound to alert the driver or prevents the driver from performing lane change when the subject vehicle is present within a distance where there is a risk of collision.

Such a vehicle control system merely provides a function of judging whether there is a possibility of collision with other vehicles traveling in the side lane to provide an alarm sound, or a function of preventing the driver from performing lane change.

SUMMARY OF THE INVENTION

According to this background, an aspect of the present disclosure is to provide a driving lane changing apparatus which may first control a subject vehicle to move adjacently to a line between a subject lane and a side lane when there is no risk of collision with other vehicles traveling in the side lane based on one condition, and then may control the subject vehicle to move to the side lane based on another condition.

In accordance with an aspect of the present disclosure, there is provided a driving lane changing apparatus including: a detector configured to detect information about one or more other vehicles traveling in a side lane or a subject lane based on received communication information or generated sensing information; a first determination unit configured to determine whether a subject vehicle can move to the side lane based on relative distance information between the one or more other vehicles and the subject vehicle; a first controller configured to control the subject vehicle to move adjacently to a line for distinguishing between the side lane and the subject lane when it is determined that the subject vehicle can move to the side lane; a second determination unit configured to calculate longitudinal relative distance information between the subject vehicle and the one or more other vehicles at a preset time point and to re-determine whether the subject vehicle can move to the side lane based on the longitudinal relative distance information; and a second controller configured to control the subject vehicle to move to the side lane when it is re-determined that the subject vehicle can move to the side lane.

In accordance with another aspect of the present disclosure, there is provided a driving lane changing method including: detecting information about other vehicles traveling in a side lane or a subject lane based on received communication information or generated sensing information; determining whether a subject vehicle can move to the side lane based on relative distance information between the other vehicles and the subject vehicle; controlling the subject vehicle to move adjacently to a line for distinguishing between the side lane and the subject lane when it is determined that the subject vehicle can move to the side lane; calculating longitudinal relative distance information between the subject vehicle and the other vehicles at a preset time point and re-determining whether the subject vehicle can move to the side lane based on the longitudinal relative distance information; and controlling the subject vehicle to move to the side lane when it is re-determined that the subject vehicle can move to the side lane.

As described above, according to the present embodiments, whether the subject vehicle can move to the side lane may be determined in a state in which the subject vehicle moves adjacent to the line of the side lane, and then the subject vehicle may be controlled to move to the side lane, thereby quickly and safely controlling the subject vehicle.

BRIEF DESCRIPTION OF THE DRAWINGS

The above and other objects, features and advantages of the present disclosure will be more apparent from the following detailed description taken in conjunction with the accompanying drawings, in which.

DETAILED DESCRIPTION OF THE EXEMPLARY EMBODIMENTS

Figure 1:
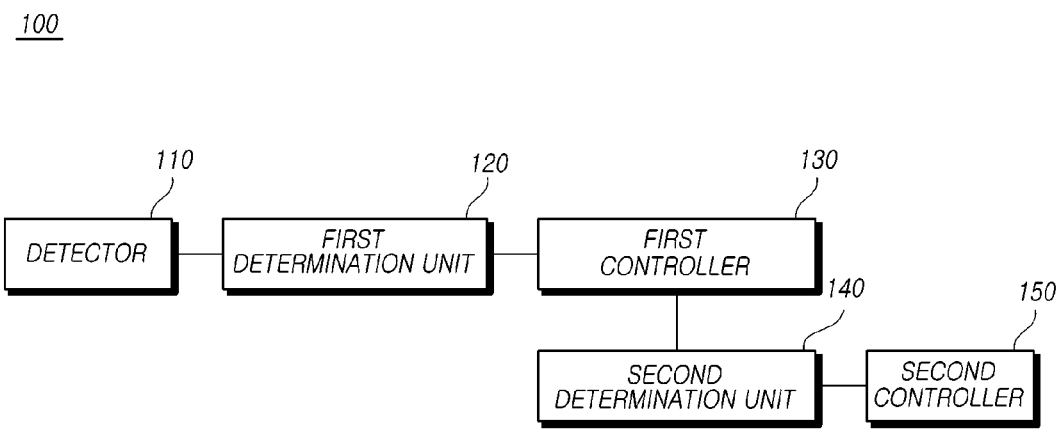
FIG. 1 is a diagram illustrating the configuration of a driving lane changing apparatus according to an embodiment.

Hereinafter, some embodiments will be described with reference to the accompanying illustrative drawings. In designating elements of the drawings by reference numerals, the same elements will be designated by the same reference numerals although they are shown in different drawings. Further, in the following description of the present disclosure, a detailed description of known functions and configurations incorporated herein will be omitted when it may make the subject matter of the present disclosure rather unclear.

In addition, terms, such as first, second, A, B, (a), (b) or the like may be used herein when describing components of the present disclosure. Each of these terminologies is not used to define an essence, order or sequence of a corresponding component but used merely to distinguish the corresponding component from other component(s). In the case that it is described that a certain structural element "is connected to", "is coupled to", or "is in contact with" another structural element, it should be interpreted that another structural element may "be connected to", "be coupled to", or "be in contact with" the structural elements as well as that the certain structural element is directly connected to or is in direct contact with another structural element FIG. 1 is a diagram illustrating the configuration of a driving lane changing apparatus according to an embodiment.

Referring to FIG. 1, a driving lane changing apparatus 100 according to an embodiment may include a detector 110 that detects information about other vehicles traveling in a side lane or a subject lane based on received communication information or generated sensing information; a first determination unit 120 that determines whether a subject vehicle can move to the side lane based on relative distance information between the other vehicles and the subject vehicle; a first controller 130 that controls the subject vehicle to move adjacently to a line for distinguishing between the side lane and the subject lane when it is determined that the subject vehicle can move to the side lane; a second determination unit 140 that calculates longitudinal relative distance information between the subject vehicle and the other vehicles at a preset time point and re-determines whether the subject vehicle can move to the side lane based on the longitudinal relative distance information; and a second controller 150 that controls the subject vehicle to move to the side lane when it is re-determined that the subject vehicle can move to the side lane.

Figure 2:
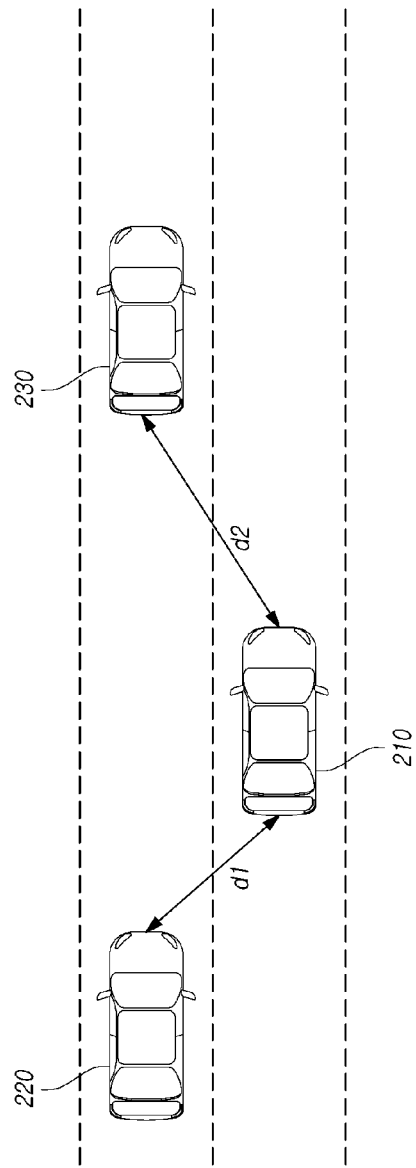
FIG. 2 is a diagram illustrating an example for explaining the operation of a detector according to an embodiment.

FIG. 2 is a diagram illustrating an example for explaining the operation of a detector according to an embodiment.

Referring to FIG. 2, the detector 110 according to an embodiment may detect relative distance information d1 and d2 and relative velocity information between a subject vehicle 210 and other vehicles 220 and 230 traveling in a side lane or a subject lane, based on communication information received from the outside and sensing information generated from a sensor that is included in the subject vehicle 210 to monitor the outside. In addition, the detector 110 may detect velocity information of the other vehicles 220 and 230.

By way of example, the detector 110 may detect the relative distance information d1 and d2 and the relative velocity information between the subject vehicle 210 and the other vehicles 220 and 230 traveling in the side lane or the subject lane, based on communication information received directly from the other vehicles 220 and 230. Specifically, the detector 110 may detect the relative distance information d1 and d2 and the relative velocity information between the subject vehicle 210 and the other vehicles 220 and 230 using position information and velocity information of the other vehicles 220 and 230 included in the communication information and position information and velocity information of the subject vehicle 210 which are known.

By way of another example, the detector 110 may detect the relative distance information d1 and d2 and the relative velocity information between the subject vehicle 210 and the other vehicles 220 and 230 traveling in the side lane based on the sensing information generated by the sensor included in the subject vehicle 210. The sensor may include at least one of a camera sensor, a radar sensor, and a lidar sensor, but the sensor type is not limited.

Meanwhile, the first determination unit 120 according to an embodiment may determine whether the subject vehicle 210 can move to the side lane based on the relative distance information d1 and d2 between the subject vehicle 210 and the other vehicles 220 and 230. Specifically, for example, when relative distance information between the subject vehicle 210 and a first other vehicle 220 is larger than at least one of relative distance information between the subject vehicle 210 and a second other vehicle 230 and relative distance information between the subject vehicle 210 and a preceding vehicle, it may be determined that the subject vehicle 210 can move to the side lane. That is, the first determination unit 120 may determine that the subject vehicle 210 can move to the side lane when the relative distance information between the subject vehicle 210 and the first other vehicle 220 is larger than the relative distance information between the subject vehicle 210 and the second other vehicle 230, and may determine that the subject vehicle 210 can move to the side lane when the relative distance information between the subject vehicle 210 and the first other vehicle 220 is larger than the relative distance information between the subject vehicle 210 and the preceding vehicle. Alternatively, when the relative distance information between the subject vehicle 210 and the first other vehicle 220 is larger than both the relative distance information between the subject vehicle 210 and the second other vehicle 230 and the relative distance information between the subject vehicle 210 and the preceding vehicle, the first determination unit 120 may determine that the subject vehicle 210 can move to the side lane.

The first determination unit 120 according to another embodiment may calculate a time to collision (TTC) based on the detected relative distance information and relative velocity information between the subject vehicle and the other vehicles. The TTC may be calculated by dividing the relative distance information by the relative velocity information. In addition, the first determination unit 120 may determine whether the subject vehicle can move to the side lane based on the calculated TTC.

Referring again to FIG. 2, when a first TTC calculated for the first other vehicle 220 traveling behind the subject vehicle 210 is larger than a second TTC calculated for the second other vehicle 230 traveling in front of the subject vehicle 210 in the side lane, the first determination unit 120 may determine that the subject vehicle 210 can move to the side lane.

Alternatively, when the first TTC calculated for the first other vehicle 220 traveling behind the subject vehicle 210 is larger than a third TTC that is a TTC with a preceding vehicle traveling in front of the subject vehicle 210 in the subject lane, the first determination unit 120 may determine that the subject vehicle 210 can move to the side lane.

Alternatively, when the first TTC calculated for the first other vehicle 220 traveling behind the subject vehicle 210 is larger than both the second TTC calculated for the second other vehicle 230 traveling in front of the subject vehicle 210 in the side lane and the third TTC that is the TTC with the preceding vehicle traveling in front of the subject vehicle 210 in the subject lane, the first determination unit 120 may determine that the subject vehicle 210 can move to the side lane.

When it is determined that the subject vehicle can move to the side lane, the first controller 130 according to an embodiment may control the subject vehicle to move adjacently to a line for distinguishing between a side lane and a subject lane.

Figure 3:
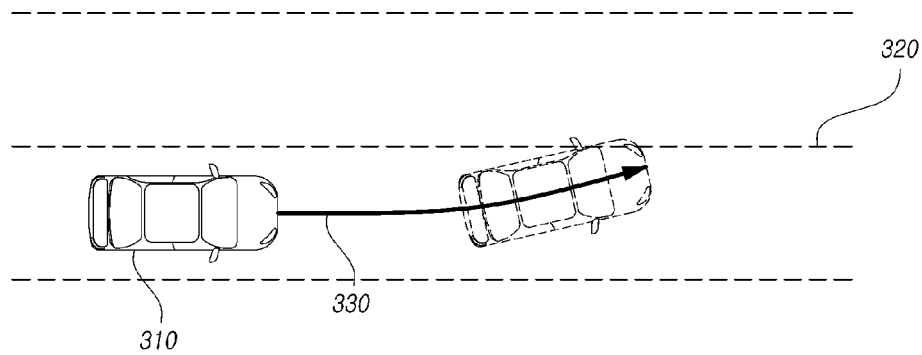
FIG. 3 is a diagram illustrating an example for explaining the operation of a first controller according to an embodiment.

FIG. 3 is a diagram illustrating an example for explaining the operation of the first controller according to an embodiment.

Referring to FIG. 3, the first controller 130 may set a path 330 through which a subject vehicle 310 moves adjacently to a line 320 for distinguishing between a side lane and a subject lane, and may control the subject vehicle 310 to travel along the set path 330. The curvature of the path 330 may be set to be inversely proportional to the velocity of the subject vehicle 310 in consideration of stability, or the like.

In this manner, the subject vehicle moves adjacently to the line 320, by which it is possible to induce deceleration of a first other vehicle which is another vehicle located behind the subject vehicle.

Meanwhile, the second determination unit 140 may determine whether longitudinal relative distance information between the subject vehicle and another vehicle is larger than a preset value at a predetermined time point, and may re-determine that the subject vehicle can move to a side lane when the longitudinal relative distance information is larger than the preset value. This provides an effect of improving safety in the case of a lane change. Here, the other vehicle may refer to the above-described first other vehicle traveling in the side lane behind the subject vehicle, or may refer to the above-described second other vehicle.

Alternatively, when the longitudinal relative distance between the subject vehicle and the first or second other vehicle measured a preset number of times is increased, the second determination unit 140 may re-determine that the subject vehicle can move to the side lane. Here, the predetermined number of times may be set in advance at predetermined time intervals based on a preset time point, or may be set in advance according to a relative position between the front wheel of the subject vehicle and the lane.

A re-determination time point of the second determination unit 140 may be set in advance. For example, the re-determination time point may be set in advance as a time point when the front wheel of the subject vehicle touches the line between the subject lane and the side lane. Alternatively, the time point set in advance may be set as a time point when the front wheel of the subject vehicle moves to a position spaced apart from the line by a predetermined distance.

In addition, the second determination unit 140 according to an embodiment may calculate a time to reach (TTR) using longitudinal relative distance information between the subject vehicle and the other vehicle and longitudinal velocity information with the other vehicle in a state in which the subject vehicle moves adjacent to the line, and may re-determine whether the subject vehicle can move to the side lane based on the calculated TTR.

Figure 4:
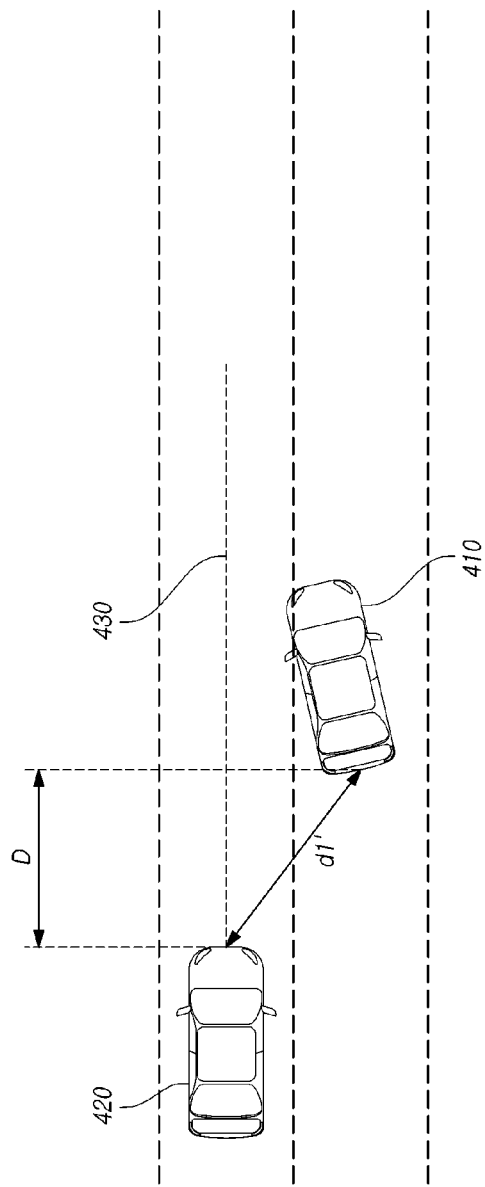
FIG. 4 is a diagram illustrating an example for explaining the operation of a second determination unit according to an embodiment.

FIG. 4 is a diagram illustrating an example for explaining the operation of the second determination unit according to an embodiment.

Referring to FIG. 4, the second determination unit 140 may calculate a TTR using longitudinal relative distance information calculated by a trigonometric function relationship of distance information between a subject vehicle 410 and a center line 430 of a side lane and relative distance information d1' between the subject vehicle 410 and another vehicle 420. The TTR may refer to a value obtained by dividing the longitudinal relative distance information by the longitudinal velocity information. For example, the TTR may be calculated using a longitudinal velocity V of the other vehicle 420 and a longitudinal distance D between the subject vehicle 410 and the other vehicle 420, and may be determined according to the following Equation 1.

Time to reach(TTR)=longitudinal relative distance information($D$)/longitudinal velocity($V$)  [Equation 1]

Here, the distance between the subject vehicle 410 and the center line 430 of the side lane may be estimated by adding a half-length of the known width of the lane to a distance between the subject vehicle 410 and the side lane. The TTR may be calculated to be equal to or shorter than the TTC calculated by the first determination unit.

Furthermore, when the calculated TTR is longer than a preset threshold time, the second determination unit 140 may determine that the subject vehicle can move to the side lane. The threshold time may be set in advance based on experimental data.

Alternatively, when the TTR calculated by a preset number of times is increased, the second determination unit 140 may determine that the subject vehicle can move to the side lane. That is, when it is determined that the other vehicle 420 is decelerated or the subject vehicle 410 is accelerated so that the subject vehicle 410 can safely perform a lane change, the second determination unit 140 may re-determine that the subject vehicle can move to the side lane.

When it is re-determined that the subject vehicle can move to the side lane, the second controller 150 may control the subject vehicle to move to the side lane.

This will be described in detail with reference to FIG. 5.

Figure 5:
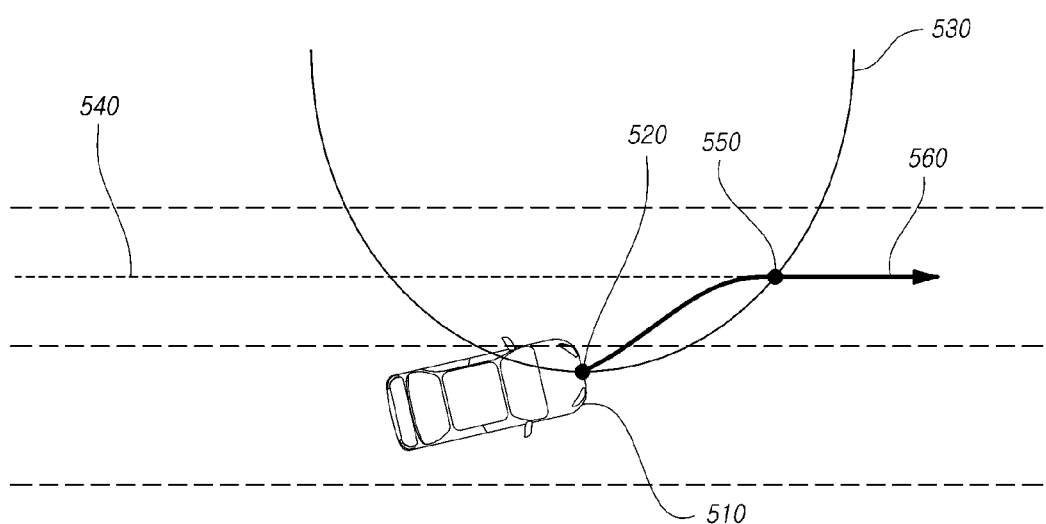
FIG. 5 is a diagram illustrating an example for explaining the operation of a second controller according to an embodiment.

FIG. 5 is a diagram illustrating an example for explaining the operation of the second controller according to an embodiment.

Referring to FIG. 5, the second controller 150 may first generate a center point 550 where a parabola 530 having a position point 520 of a subject vehicle 510 as a vertex while having a preset slope meets a center line 540 of a side lane. In addition, the second controller 150 may set a target path 560 moving from the position point 520 to the center point 550, and may control the subject vehicle 510 to travel along the target path. The target path 560 may be set as a path through which the subject vehicle 510 can stably move from the position point 520 to the center point 550. Specifically, the target path 560 may be set by combining the parabola 530 having the position point 520 as the vertex and another parabola (not shown) having the center point 550 as a vertex while having the same slope as that of the parabola 530. Alternatively, the second controller 150 may use a parabolic blending method in setting the target path 560. For example, the second controller 150 may control a movement path of the subject vehicle to be generated within an area where the above-described two parabolas overlap each other. Here, a slope of a parabola may refer to a value A in a parabola generated through an equation of $y=Ax^2$, and can be expressed in various terms such as slope, width, curvature, and the like.

When the target path is set in this manner, the second controller 150 may track the position of the subject vehicle to calculate a movement path, may compare the calculated movement path with the set target path to calculate an error of the movement path, and may control the steering or velocity of the subject vehicle so that the calculated error of the movement path is reduced. In this case, the detection unit 110 may further detect the position of the subject vehicle, and the detected position of the subject vehicle may be stored for a predetermined time to calculate the movement path.

Meanwhile, the second controller 150 may use a parabola having a slope proportional to the velocity of the subject vehicle in setting the target path. That is, the second controller 150 may generate a center point where a parabola having a position point of the subject vehicle as a vertex while having a slope set in proportion to the velocity of the subject vehicle meets a center line of a side lane, and may set a target path moving from the position point to the center point. To this end, the detector 110 should further detect the velocity of the subject vehicle.

As the second controller 150 sets the target path using the slope proportional to the velocity of the subject vehicle, the curvature of the target path may be gentle so that the stability of the subject vehicle can be ensured.

When it is re-determined that the subject vehicle cannot move to the side lane, the second controller 150 may control the subject vehicle to travel adjacent to the line for distinguishing between the side lane and the subject lane. When the subject vehicle is controlled to travel adjacent to the line according to this situation, the driving lane changing apparatus 100 according to an embodiment may operate only the detector 110, the second determination unit 140, and the second controller 150. In this case, only the detector 110, the second determination unit 140, and the second controller 150 are operated, so that the processing speed can be improved. Thus, it is possible to prevent a situation in which the subject vehicle may miss the timing to move to the side lane according to the processing speed.

Meanwhile, the operation of the driving lane changing apparatus 100 according to an embodiment described with reference to FIGS. 1 to 5 may be performed only when a lane change signal is detected. The lane change signal may refer to a signal indicating that the subject vehicle is about to move to the side lane, and may include a signal by a turn signal of the subject vehicle, a signal by an action that can be detected from a driver before the subject vehicle moves to the side lane, and the like. Alternatively, the operation of the driving lane changing apparatus 100 may be performed only when the lane change signal is detected under the situation that a lane keeping function is operated. The lane keeping function refers to a function to detect whether a subject vehicle has deviated from lines of a traveling lane. The lane change signal can be detected by the detector.

By way of example, when the lane change signal is detected, the first determination unit may determine whether the subject vehicle can move to the side lane.

The driving lane changing apparatus 100 according to an embodiment described above may control the subject vehicle in accordance with a relationship with other vehicles traveling in the side lane or the velocity of the subject vehicle, thereby inducing the subject vehicle to safely move to the side lane.

Meanwhile, a driving lane changing apparatus according to another embodiment may be operated considering further a preceding vehicle that is traveling in the same lane as that of the subject vehicle in order to induce the subject vehicle to safely move to the side lane.

Specifically, by way of example, there may be a first situation in which there is a first other vehicle traveling behind the subject vehicle and a preceding vehicle traveling in the same lane as that of the subject vehicle. In this first situation, the detector of the driving lane changing apparatus may further detect relative distance information and relative velocity information between the subject vehicle and the preceding vehicle. Thus, the first determination unit may further calculate a third TTC using the relative distance information and the relative velocity information between the subject vehicle and the preceding vehicle, and may determine that the subject vehicle can move to the side lane when a first TTC that is a TTC with the first other vehicle is longer than the third TTC.

Specifically, by way of another example, there may be a second situation in which there are a first other vehicle traveling behind the subject vehicle, a second other vehicle traveling in front of the subject vehicle in the side lane, and a preceding vehicle traveling in the same lane as that of the subject vehicle. In this second situation, the detector of the driving lane changing apparatus may further detect relative distance information and relative velocity information between the subject vehicle and the preceding vehicle. Thus, the first determination unit may further calculate a third TTC using the relative distance information and the relative velocity information between the subject vehicle and the preceding vehicle. Next, when a first TTC that is a TTC with the first other vehicle is longer than a second TTC that is a TTC with the second other vehicle and longer than the third TTC, the first determination unit may determine that the subject vehicle can move to the side lane.

Hereinafter, a driving lane changing method, which is performed by the driving lane changing apparatus described with reference to FIGS. 1 to 5, will be briefly described.

Figure 6:
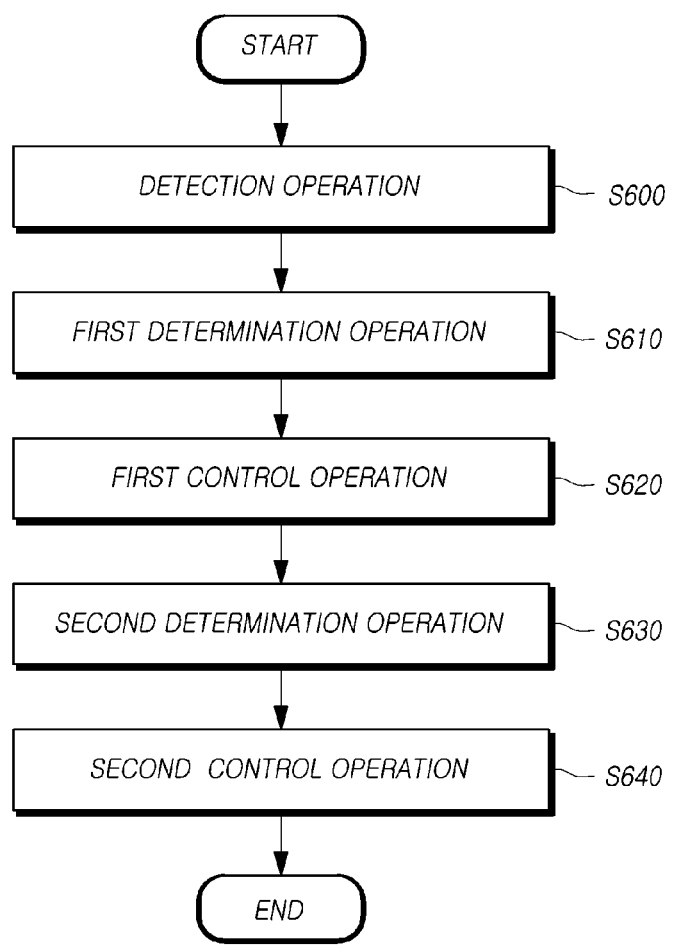
FIG. 6 is a flowchart illustrating a driving lane changing method according to an embodiment.

FIG. 6 is a flowchart illustrating a driving lane changing method according to an embodiment.

Referring to FIG. 6, the driving lane changing method may include detection operation S600 of detecting information about other vehicles traveling in a side lane or a subject lane based on received communication information or generated sensing information; a first determination operation S610 of determining whether a subject vehicle can move to the side lane based on relative distance information between the other vehicles and the subject vehicle; a first control operation S620 of controlling the subject vehicle to move adjacently to a line for distinguishing between the side lane and the subject lane when it is determined that the subject vehicle can move to the side lane; a second determination operation S630 of calculating longitudinal relative distance information between the subject vehicle and the other vehicles at a preset time point and re-determining whether the subject vehicle can move to the side lane based on the longitudinal relative distance information; and second control operation S640 of controlling the subject vehicle to move to the side lane when it is re-determined that the subject vehicle can move to the side lane.

Detection operation S600 according to an embodiment may detect the information about the other vehicles traveling in the side lane or the subject lane based on the communication information received from the outside or the sensing information generated from a sensor that is included in the subject vehicle to monitor the outside. For example, detection operation S600 may detect relative distance information and relative velocity information.

By way of example, detection operation S600 may detect relative distance information and relative velocity information between the subject vehicle and the other vehicles traveling in the side lane or the subject lane based on communication information received directly from the other vehicles. Specifically, for example, detection operation S600 may detect the relative distance information and relative velocity information between the subject vehicle and the other vehicles using position information and velocity information of the other vehicles included in the communication information and position information and velocity information of the subject vehicle which are known.

By way of another example, detection operation S600 may detect the relative distance information and the relative velocity information between the subject vehicle and the other vehicles traveling in the side lane or the subject lane based on the sensing information generated by the sensor included in the subject vehicle. The sensor may include at least one of a camera sensor, a radar sensor, and a lidar sensor.

Hereinafter, first determination operation and second determination operation will be described in detail with reference to the drawings.

Figure 7:
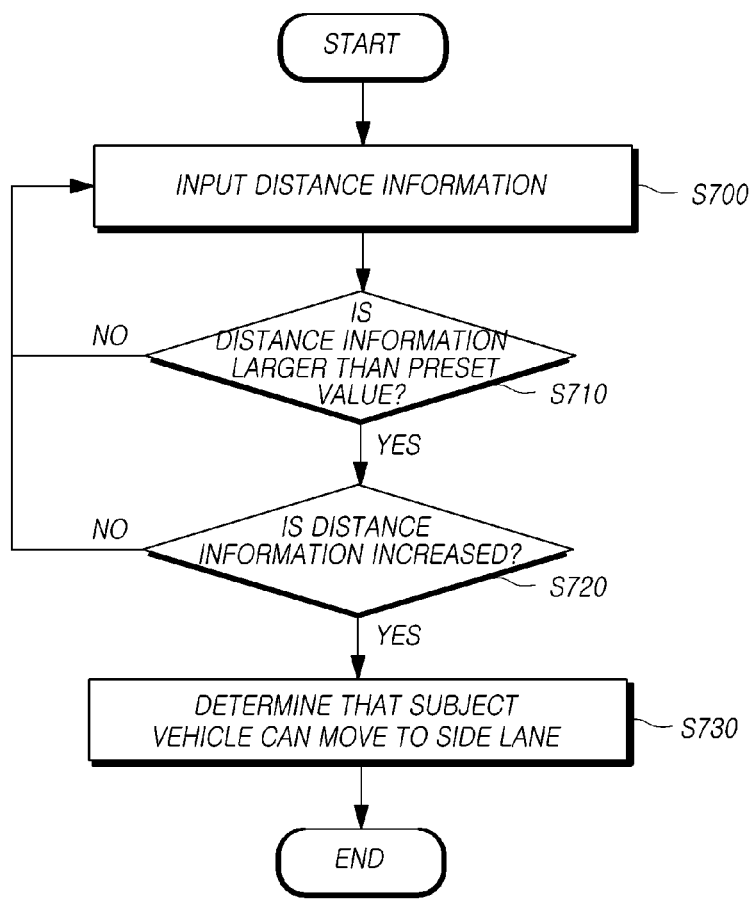
FIG. 7 is a diagram for explaining a procedure for determining whether a subject vehicle can move to a side lane using distance information.

FIG. 7 is a diagram for explaining a procedure for determining whether a subject vehicle can move to a side lane using distance information.

Referring to FIG. 7, when distance information is input in operation S700, the first determination operation determines whether the distance information is equal to or larger than a preset value in operation S710. When the distance information is equal to or larger than the preset value, whether the corresponding distance information is continuously increased for a preset number of times is determined in operation S720. When it is determined that the received distance information is continuously increased, the first determination operation determines that the subject vehicle can move to the side lane in operation S730. Here, the distance information refers to relative distance information between the subject vehicle and a first other vehicle.

In addition, operation S710 may be omitted as necessary. Alternatively, operation S720 may be omitted.

Meanwhile, the operation of FIG. 7 may also be applied to second determination operation.

Referring again to FIG. 7, when the distance information is input in operation S700, the first determination operation determines whether the distance information is equal to or larger than the preset value in operation S710. When the distance information is equal to or larger than the preset value, whether the corresponding distance information is continuously increased for the preset number of times is determined in operation S720. When it is determined that the received distance information is continuously increased, the first determination operation determines that the subject vehicle can move to the side lane in operation S730. Here, the distance information refers to longitudinal relative distance information between the subject vehicle and the first other vehicle. Operation S710 or S720 may be omitted as necessary.

Figure 8:
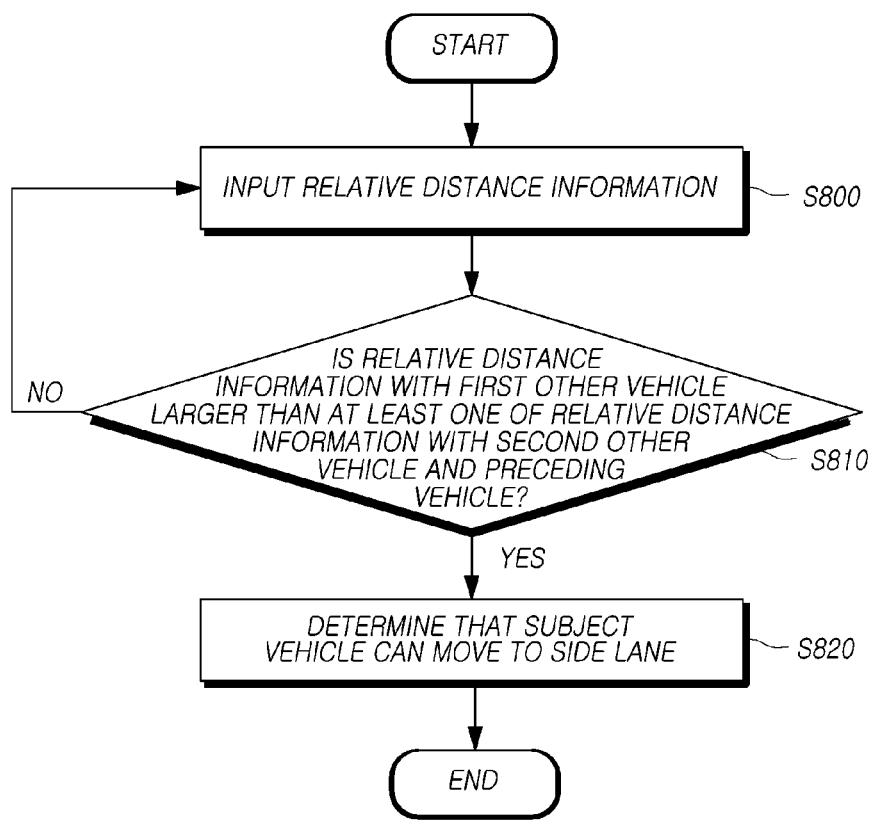
FIG. 8 is a diagram for explaining whether a subject vehicle can move to a side lane through comparison with relative distance information with a plurality of other vehicles.

FIG. 8 is a diagram for explaining whether a subject vehicle can move to a side lane through comparison of relative distance information with a plurality of other vehicles.

Referring to FIG. 8, when relative distance information is received in operation S800, the first determination operation determines whether relative distance information with a first other vehicle is larger than at least one of relative distance information with a second other vehicle and relative distance information with a preceding vehicle in operation S810. As described above, the first determination operation may determine that the subject vehicle can move to the side lane when the relative distance information with the first other vehicle is larger than the relative distance information with the second other vehicle, and may determine that the subject vehicle can move to the side lane when the relative distance information between the subject vehicle and the first other vehicle is larger than the relative distance information between the subject vehicle and the preceding vehicle. Alternatively, the first determination operation may determine that the subject vehicle can move to the side lane when the relative distance information between the subject vehicle and the first other vehicle is larger than both the relative distance information between the subject vehicle and the second other vehicle and the relative distance information between the subject vehicle and the preceding vehicle.

When the relative distance information with the first other vehicle is larger than at least one of the relative distance information with the second other vehicle and the relative distance information between the subject vehicle and the preceding vehicle, it is determined that the subject vehicle can move to the side lane in operation S820.

Meanwhile, as described above, the first determination operation and the second determination operation may be performed using a TTC and a TTR.

Figure 9:
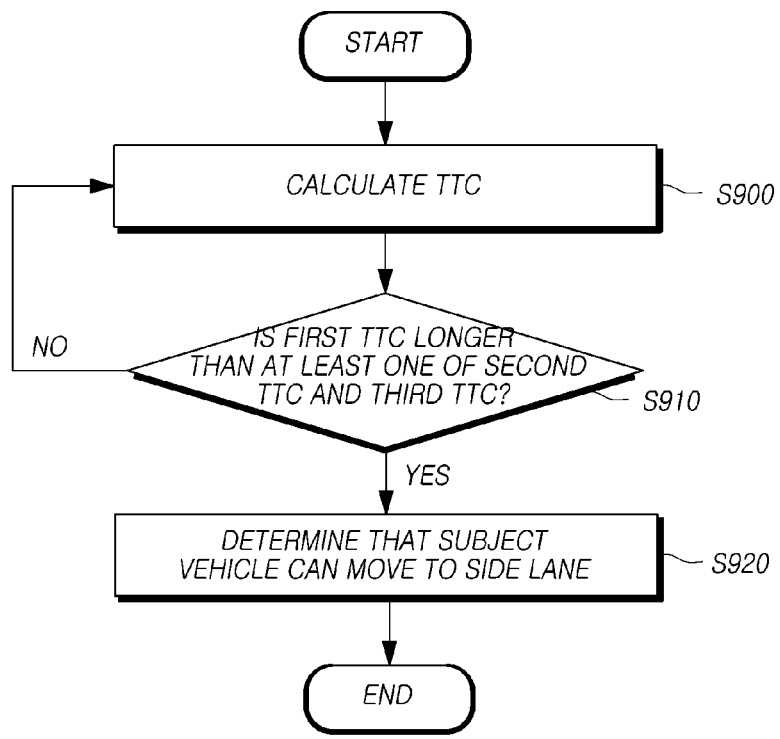
FIG. 9 is a diagram for explaining an operation of determining whether a subject vehicle can move to a side lane using a time to collision (TTC)

FIG. 9 is a diagram for explaining an operation of determining whether a subject vehicle can move to a side lane using a TTC.

Referring to FIG. 9, the first determination operation may calculate a TTC based on the detected relative distance information and relative velocity information with the other vehicles in operation S900. The TTC may be calculated by dividing the relative distance information by the relative velocity information. In addition, the first determination operation may determine whether the subject vehicle can move to the side lane based on the calculated TTC.

The first determination operation determines whether a first TTC that is a TTC of the first other vehicle is longer than at least one of a second TTC that is a TTC of the second other vehicle and a third TTC that is a TTC of the preceding vehicle in operation S910.

For example, when the first TTC calculated for the first other vehicle traveling behind the subject vehicle is longer than the second TTC calculated for the second other vehicle traveling in front of the subject vehicle in the side lane, the first determination operation may determine that the subject vehicle can move to the side lane in operation S920. Alternatively, when the first TTC calculated for the first other vehicle traveling behind the subject vehicle is longer than the third TTC calculated for the preceding vehicle traveling in front of the subject vehicle, the first determination operation may determine that the subject vehicle can move to the side lane in operation S920. Alternatively, when the first TTC calculated for the first other vehicle traveling behind the subject vehicle is longer than both the second TTC calculated for the second other vehicle traveling in front of the subject vehicle in the side lane and the third TTC calculated for the preceding vehicle traveling in front of the subject vehicle, the first determination operation may determine that the subject vehicle can move to the side lane in operation S920.

Next, when it is determined that the subject vehicle can move to the side lane, the first control operation may control the subject vehicle to move adjacently to a line for distinguishing between the side lane and a subject lane. Specifically, the first control operation S620 may set a path through which the subject vehicle moves adjacent to the line for distinguishing between the side lane and the subject lane, and may control the subject vehicle to travel along the set path. The curvature of the path may be set to be inversely proportional to the velocity of the subject vehicle in consideration of stability, or the like.

Meanwhile, in the second determination operation, a re-determination operation may be performed based on a TTR.

Figure 10:
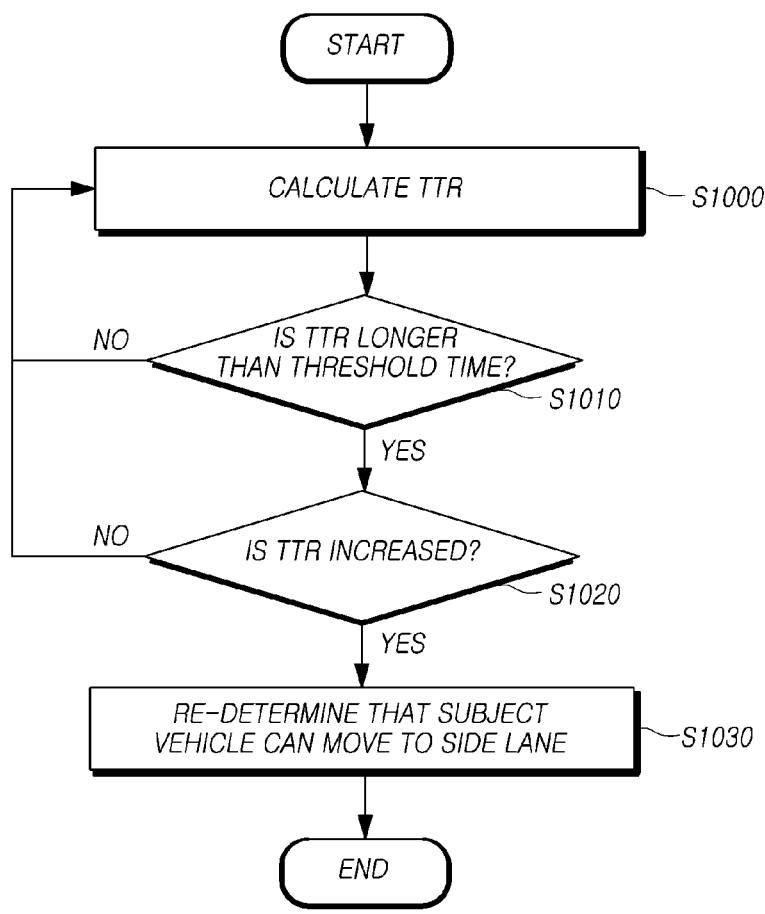
FIG. 10 is a diagram for explaining an operation of re-determining whether a subject vehicle can move to a side lane based on a time to reach (TTR).

FIG. 10 is a diagram for explaining an operation of re-determining whether a subject vehicle can move to a side lane based on a TTR.

Referring to FIG. 10, the second determination operation further calculates longitudinal velocity information of the first other vehicle, and calculates a TTR based on longitudinal relative distance information and the longitudinal velocity information in operation S1000. For example, the second determination operation may calculate the TTR using the longitudinal relative distance information between the subject vehicle and the other vehicles and the longitudinal velocity information at a preset time point (for example, a state in which the subject vehicle moves adjacent to the line), and may re-determine whether the subject vehicle can move to the side lane based on the calculated TTR. Specifically, the second determination operation may calculate the TTR using longitudinal relative distance information calculated by a trigonometric function relationship of distance information between the subject vehicle and a center line of the side lane and relative distance information between the subject vehicle and the other vehicle. The TTR may refer to a value obtained by dividing the longitudinal relative distance information by the longitudinal velocity information. Here, the distance between the subject vehicle and the center line of the side lane may be estimated by adding a half-length of the known width of the lane to a distance between the subject vehicle and the side lane. The TTR may be calculated to be equal to or shorter than the TTC calculated in the first determination operation.

Furthermore, the second determination operation may determine whether the calculated TTR is longer than a preset threshold time in operation S1010. The threshold time may be set in advance based on experimental data.

Alternatively, the second determination operation may determine whether the TTR calculated by a preset number of times is continuously increased in operation S1020. When it is determined that the TTR is continuously increased, the second determination operation may re-determine whether the subject vehicle can move to the side lane in operation S1030.

The operation S1010 or S1020 described above may be omitted as necessary.

When it is re-determined that the subject vehicle can move to the side lane, the second control operation according to an embodiment may control the subject vehicle to move to the side lane. Specifically, the second control operation S640 may generate a center point where a parabola having a position point of the subject vehicle as a vertex while having a preset slope meets the center line of the side lane. In addition, the second control operation may set a target path moving from the position point to the center point, and may control the subject vehicle to travel along the target path. The target path may be set as a path through which the subject vehicle can stably move from the position point to the center point. Specifically, the target path may be set by combining the parabola having the position point as the vertex and another parabola having the center point as a vertex while having the same slope as that of the parabola. Alternatively, the second control operation may use a parabolic blending method in setting the target path.

When the target path is set in this manner, the second control operation may track the position of the subject vehicle to calculate a movement path, may compare the calculated movement path with the set target path to calculate an error of the movement path, and may control the steering or velocity of the subject vehicle so that the calculated error of the movement path is reduced. In this case, the detection operation may further detect the position of the subject vehicle, and the detected position of the subject vehicle may be stored for a predetermined time to calculate the movement path.

Meanwhile, the second control operation S640 may use a parabola having a slope proportional to the velocity of the subject vehicle in setting the target path. That is, the second control operation may generate a center point where a parabola having a position point of the subject vehicle as a vertex while having a slope set in proportion to the velocity of the subject vehicle meets the center line of the side lane, and may set a target path moving from the position point to the center ponit. To this end, the detection operation should further detect the velocity of the subject vehicle.

As second control operation sets the target path using the slope proportional to the velocity of the subject vehicle, the curvature of the target path may be gentle so that the stability of the subject vehicle can be ensured.

Meanwhile, the operation of the driving lane changing method according to an embodiment may be performed when a lane change signal is detected. The lane change signal may refer to a signal indicating that the subject vehicle is about to move to the side lane. By way of example, the lane change signal may include a signal by a turn signal of the subject vehicle, a signal by an action that can be detected from a driver before the subject vehicle moves to the side lane, and the like. The lane change signal may be detected by the detector. Alternatively, the operation of the driving lane changing method may be performed only when a lane keeping function is operated.

By way of example, when the lane change signal is detected, whether the subject vehicle can move to the side lane may be determined through the first determination operation.

In addition, the driving lane changing method may perform all the operations performed by the lane changing apparatus described with reference to FIGS. 1 to 10.

The above description and the accompanying drawings provide an example of the technical idea of the present disclosure for illustrative purposes only. Those having ordinary knowledge in the technical field, to which the present disclosure pertains, will appreciate that various modifications and changes in form, such as combination, separation, substitution, and change of a configuration, are possible without departing from the essential features of the present disclosure. Therefore, the embodiments disclosed in the present disclosure are intended to illustrate the scope of the technical idea of the present disclosure, and the scope of the present disclosure is not limited by the embodiment. The scope of the present disclosure shall be construed on the basis of the accompanying claims in such a manner that all of the technical ideas included within the scope equivalent to the claims belong to the present disclosure.

What is claimed is:

1. A driving lane changing apparatus of a host vehicle, the driving lane changing apparatus comprising a microcontroller, wherein the microcontroller is configured to:
   detect information about a first vehicle traveling in a neighboring lane from a current lane of the host vehicle using a sensor of the host vehicle, wherein the detected information includes a first distance between the first vehicle and the host vehicle and a first velocity of the first vehicle;
   calculate a time to collision with the first vehicle based on the detected information of the first vehicle and host information of a current position and a current velocity of the host vehicle;
   control the host vehicle such that the host vehicle is moved adjacent to a road mark line distinguishing between the current lane of the host vehicle and the neighboring lane based on the calculated time to collision with first vehicle;
   when the host vehicle is adjacent to the road mark line, detect, using the sensor of the host vehicle, a longitudinal relative distance between the host vehicle and the first vehicle at a preset time point in which the host vehicle moves to the road mark line;
   calculate, based on the detected longitudinal relative distance and the first velocity of the first vehicle, a time to reach a point at a center line of the neighboring lane by the first vehicle, wherein the center is measured in the width direction of the neighboring lane; and
   control the host vehicle such that the host vehicle is moved to the point at the center line of the neighboring lane based on the calculated time to reach the point at the center line of the neighboring lane by the first vehicle,
   wherein the longitudinal relative distance is detected by calculating a trigonometric function relationship of the first distance and a distance between the host vehicle and the center line of the neighboring lane.

2. The driving lane changing apparatus of claim 1, wherein when the microcontroller detects, using the sensor of the host vehicle, information about the first vehicle traveling behind the host vehicle in the neighboring lane, a second vehicle traveling in front of the host vehicle in the neighboring lane, and a preceding vehicle traveling in front of the host vehicle in the current lane, the detected information includes the first distance between the first vehicle and the host vehicle, a second distance between the host vehicle and the second vehicle, and a third distance between the host vehicle and the preceding vehicle, and
   the microcontroller controls the host vehicle such that the host vehicle moves to the line distinguishing between the current lane of the host vehicle and the neighboring lane when the first distance between the host vehicle and the first vehicle is larger than at least one of the second distance between the host vehicle and the second vehicle and the third distance between the host vehicle and the preceding vehicle.

3. The driving lane changing apparatus of claim 1, wherein when the microcontroller detects, using the sensor of the host vehicle, information about the first vehicle traveling behind the host vehicle in the neighboring lane, a second vehicle traveling in front of the host vehicle in the neighboring lane, and a preceding vehicle traveling in front of the host vehicle in the current lane, the detected information includes the first distance between the first vehicle and the host vehicle, the first velocity of the first vehicle, a second distance between the host vehicle and the second vehicle, a second velocity of the second vehicle, a third distance between the host vehicle and the preceding vehicle, and a third velocity of the preceding vehicle, and
   the microcontroller
      calculates, a first time to collision with the first vehicle based on the detected information of the first vehicle and the host information of the host vehicle, a second time to collision with the second vehicle based on the detected information of the second vehicle and the host information of the host vehicle, a third time to collision with the preceding vehicle based on the detected information of the preceding vehicle and the host information of the host vehicle,
      controls the host vehicle such that the host vehicle moves to the road mark line distinguishing between the current lane of the host vehicle and the neighboring lane when the first time to collision is greater than at least one of the second time to collision and the third time to collision.

4. The driving lane changing apparatus of claim 1, wherein the microcontroller controls the host vehicle such that the host vehicle moves to the road mark line distinguishing between the current lane of the host vehicle and the neighboring lane when it is detected that re- when the first distance has increased during a preset time period.

5. The driving lane changing apparatus of claim 1, wherein the microcontroller controls the host vehicle such that the host vehicle moves to the road mark line distinguishing between the current lane of the host vehicle and the neighboring lane when it is detected that when the calculated time to collision with the first vehicle has increased during a preset time period.

6. The driving lane changing apparatus of claim 1, wherein the microcontroller generates a point representing a vertex of a theoretical parabola that intersects the center line of the neighboring lane and controls the host vehicle such that the host vehicle travels along a target path moving from the current position of the host vehicle to the point representing the vertex of the theoretical parabola, wherein the vertex has a preset slope.

7. The driving lane changing apparatus of claim 1, wherein the microcontroller generates a point representing a vertex of a theoretical parabola that intersects the center line of the neighboring lane and controls the host vehicle such that the host vehicle travels along a target path moving from a current position of the host vehicle to the point representing the vertex of the theoretical parabola, wherein the vertex has a slope set in proportion to the current velocity of the host vehicle.

8. A driving lane changing method performed by a driving lane changing apparatus comprising a microcontroller, the method comprising:
   detecting information about a first vehicle traveling in a neighboring lane from the host vehicle or a current lane of the host vehicle using a sensor of the host vehicle;
   calculating a time to collision with the first vehicle based on the detected information of the first vehicle and host information of a current position and a current velocity of the host vehicle;

controlling the host vehicle such that the host vehicle is moved adjacent to a road mark line distinguishing between the current lane of the host vehicle and the neighboring lane based on the calculated time to collision with first vehicle;

when the host vehicle is adjacent to the road mark line, detecting, using the sensor of the host vehicle, a longitudinal relative distance between the host vehicle and the first vehicle at a preset time point in which the host vehicle moves to the road mark line; and calculating, based on the detected longitudinal relative distance and the first velocity of the first vehicle, a time to reach a point at a center line of the neighboring lane by the first vehicle, wherein the center is measured in the width direction of the neighboring lane; and controlling the host vehicle such that the host vehicle is moved to the point at the center line of the neighboring lane based on the calculated time to reach the point at the center line of the neighboring lane by the first vehicle, wherein the longitudinal relative distance is detected by calculating a trigonometric function relationship of the first distance and a distance between the host vehicle and the center line of the neighboring lane.

9. The driving lane changing method of claim 8, wherein when the microcontroller detects, using the sensor of the host vehicle, information about the first vehicle traveling behind the host vehicle in the neighboring lane, a second vehicle traveling in front of the host vehicle in the neighboring lane, and a preceding vehicle traveling in front of the host vehicle in the current lane of the host vehicle, and the detected information includes the first distance between the first vehicle and the host vehicle, a second distance between the host vehicle and the second vehicle, and a third distance between the host vehicle and the preceding vehicle, the microcontroller controls the host vehicle such that the host vehicle is moved to the road mark line distinguishing between the current lane of the host vehicle and the neighboring lane when the first distance between the host vehicle and the first vehicle is larger than at least one of the second distance between the host vehicle and the second vehicle and the third distance between the host vehicle and the preceding vehicle.

* * * * *